US007995096B1

(12) United States Patent
Cressy et al.

(10) Patent No.: US 7,995,096 B1
(45) Date of Patent: Aug. 9, 2011

(54) VISUAL SECURITY OPERATIONS SYSTEM

(75) Inventors: Christopher Cressy, Arlington, VA (US); Michael Thompson, Fairfax, VA (US); Douglas H. Cox, Apex, NC (US)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 09/667,625

(22) Filed: Sep. 22, 2000

Related U.S. Application Data

(60) Provisional application No. 60/155,480, filed on Sep. 23, 1999.

(51) Int. Cl.
*H04N 7/18* (2006.01)

(52) U.S. Cl. ........................................ 348/153; 348/143

(58) Field of Classification Search .................. 348/152, 348/153, 154
See application file for complete search history.

(56) References Cited

U.S. PATENT DOCUMENTS

| | | | | | |
|---|---|---|---|---|---|
| 5,109,278 | A | | 4/1992 | Erickson et al. | |
| 5,109,279 | A | | 4/1992 | Ando | |
| 5,111,291 | A | * | 5/1992 | Erickson et al. | 348/152 |
| 5,526,041 | A | * | 6/1996 | Glatt | 348/143 |
| 5,650,800 | A | * | 7/1997 | Benson | 345/173 |
| 5,729,471 | A | * | 3/1998 | Jain et al. | 725/131 |
| 5,872,594 | A | * | 2/1999 | Thompson | 348/211.6 |
| 6,014,167 | A | * | 1/2000 | Suito et al. | 348/169 |
| 6,097,429 | A | * | 8/2000 | Seeley et al. | 348/154 |
| 6,144,797 | A | * | 11/2000 | MacCormack et al. | 386/46 |
| 6,154,133 | A | * | 11/2000 | Ross et al. | 340/541 |
| 6,266,082 | B1 | * | 7/2001 | Yonezawa et al. | 348/159 |
| 6,317,152 | B1 | * | 11/2001 | Hobson et al. | 348/150 |
| 6,359,647 | B1 | * | 3/2002 | Sengupta et al. | 348/154 |
| 6,411,209 | B1 | * | 6/2002 | Lyons et al. | 340/541 |
| 6,476,858 | B1 | * | 11/2002 | Ramirez Diaz et al. | 348/159 |
| 6,665,004 | B1 | * | 12/2003 | Paff | 348/156 |
| 7,019,770 | B1 | * | 3/2006 | Katz | 348/14.01 |
| 7,194,426 | B1 | * | 3/2007 | Box | 705/26 |

* cited by examiner

*Primary Examiner* — David Czekaj
(74) *Attorney, Agent, or Firm* — Harness, Dickey & Pierce, P.L.C.

(57) ABSTRACT

A security alarm monitor is disclosed that uses a combination of three dimensional (3D) and two dimensional (2D) visualization to display the status of security devices and allow the operator to respond to alarms. The alarm monitor console includes 3D and 2D display areas, either in a split screen on a single monitor or on dual monitors. The 3D display area uses a photo-realistic representation of a facility and overlays iconic or 3D representations of the security devices showing their locations, coverage areas, and alarm status. The 2D display area shows a map, architectural drawing, image-based overhead view, or combination or the three for a facility and security device icons. The alarm representations in the 2D and 3D display areas are synchronized. The 3D display gives a dynamic view of the facility or compound. When an alarm occurs, the 3D display flies to preprogrammed view of the alarm location, issues a preprogrammed audio alert, and animates the alarm icon to indicate its status.

47 Claims, 7 Drawing Sheets

VISUAL SECURITY OPERATIONS SYSTEM

REFERENCE TO RELATED APPLICATION

The present invention is the subject of provisional application Ser. No. 60/155,480 filed Sep. 23, 1999 and entitled VISUAL SECURITY OPERATIONS CONSOLE.

BACKGROUND AND BRIEF DESCRIPTION OF THE INVENTION

Video monitoring systems for monitoring the plurality of areas in a given facility as well as incorporating sensors and alarm systems for actuating various video monitors at different sections of a facility are known. See U.S. Pat. Nos. 5,057,818, 5,144,661 and 4,141,006. However, such prior art systems do not provide a realistic presentation to the operating personnel.

According to the invention, a security alarm monitor which uses a combination of three-dimensional (3D) and two-dimensional (2D) visualizations to display the status of security devices and allow the operator to respond to alarms. The alarm monitor console includes 3D and 2D display areas, either in split-screen or on a single monitor or on dual monitors. The 3D display area uses a photo-realistic representation of a facility and overlays iconic or 3D representations of a plurality of security devices, showing their locations, coverage areas, and alarm status. The 2D display area shows a map, architectural drawing, image-based overhead view or combination of the three for a facility and security device icon. The alarm representations in the 2D and 3D display areas are synchronized, and the 3D display gives a dynamic view of the facility or compound. When the alarm occurs, the 3D display flies to the preprogrammed view of the alarm location, issues a preprogrammed audio alert, and animates the alarm icon to indicate its status.

Furthermore, the invention provides visual security monitoring system for monitoring outdoor security systems of a facility comprising a plurality of video cameras to include security cameras and video switchers and/or multiplexers. There is provided a plurality of security devices to include intrusion detection, access control, GPS, other security software, and/or digital video recording systems. There is provided a plurality of digital interfaces connected to receive alarm signals from said security devices and correlating said alarms and said video systems, and display monitors for sequentially displaying video images from said video switchers and/or multiplexers. A computer is connected to the digital interfaces and one or more video display monitors for automatically displaying video based on alarm inputs from said security systems. A computer display monitor, preferably having a touch screen pointing device, but other pointing devices can be used, for graphical display of alarm events from said security systems in a geographic context.

In one preferred embodiment, in the visual security monitoring system defined above, the computer causes three-dimensional (3D) visual simulation of said facility to be displayed on said computer display monitor using a geometric computer model derived from imagery and/or photographs such that the said monitor displays a spatially accurate and realistic visual representation of the facility.

In another preferred embodiment, in the visual security monitoring system defined above, each video camera and each security device is represented as a 3D geometric model or 3D sensor icon, and wherein each 3D sensor icon represents both the physical device and its coverage area, wherein each 3D sensor icon is rendered in 3D visual simulation at a position in 3-space corresponding to its approximate geographic location and area of coverage.

In another preferred embodiment, in the visual security monitoring system defined above, the physical status and/or alarm status of the security devices and/or cameras are displayed graphically by altering the visual properties of each corresponding 3D sensor icon defined above in response to the alarm inputs, and wherein a plurality of visual properties may be used to represent alarm states including colors, textures, and animation of said visual properties.

In another preferred embodiment, the visual security monitoring system defined above provides transitions of the 3D eye point of the photo-realistic simulation to a lookdown angle optimal for viewing the simulation of said alarm inputs with rapid, smooth, and continuous motion that simulates flying to that location in 3-space in response to:

(1) a user graphically selecting any of the 3D sensor icons in the said photo-realistic visual simulation, and/or (2) alarm inputs from the security and/or video devices.

Finally, in another preferred embodiment, the visual security monitoring system defined above sends any hardware or software command to any security device, the video systems, other hardware, and/or other software in response to:

(1) a user graphically selecting any of the volumetric areas in the photo-realistic visual simulation, and/or (2) alarm inputs from the security and/or video devices.

Thus, the object of the invention is to provide an improved visual security monitoring system which provides a more realistic and user-friendly display of alarm conditions.

Another object of the present invention is to provide a more realistic and dynamic presentation of a facility or compound in the areas where there is an alarm situation.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 10:
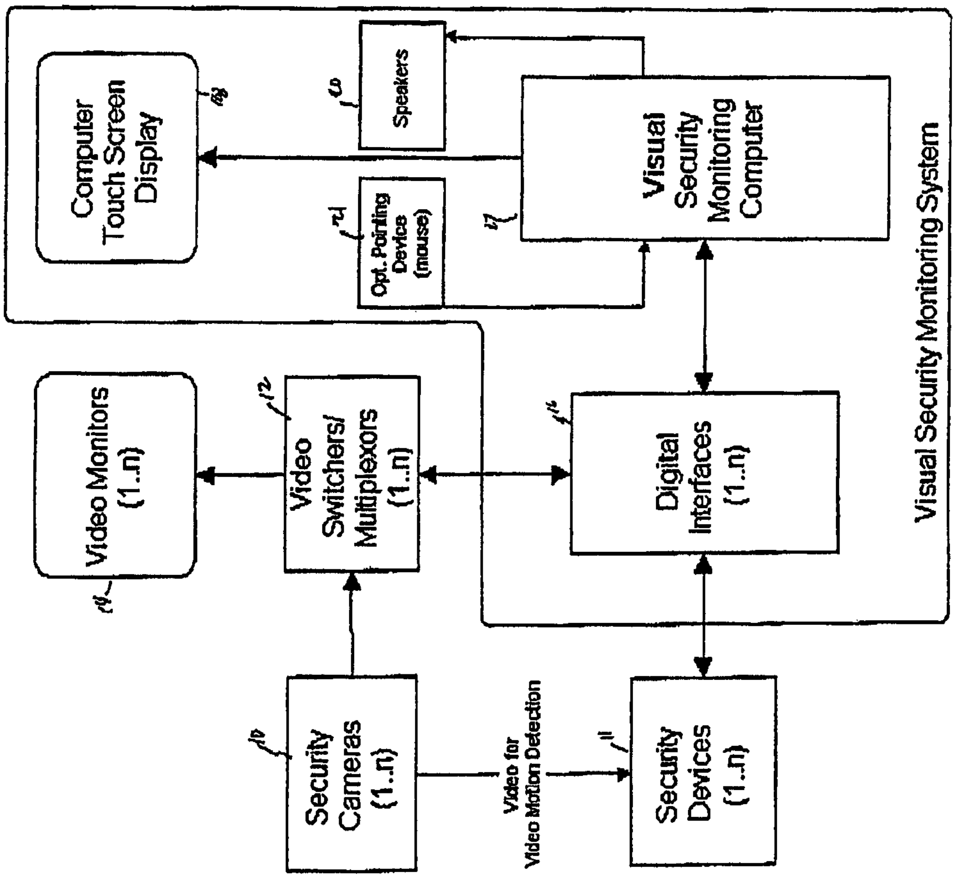
FIG. 10 displays a block diagram of a security system incorporating the invention.

Referring initially to FIG. 10, the functional block diagram illustrates how the invention controls and communicates with other equipment at a facility. One or more video security cameras 10 are dispersed at a plurality of selected locations dispersed about the facility to be monitored and produce corresponding video signals. The security devices 11 can include a plurality of video motion detectors, one coupled to each video camera, for automatically detecting moving objects in the selected locations and producing alarm signals for each of the cameras and intrusion detectors such as infrared perimeter-intrusion detection devices (ITD), there being at least one ITD at selected locations being monitored and producing second alarm signals corresponding thereto.

The video switcher/multiplexer 12 is connected to receive video signals from the security video cameras 10 and supply them to one or more video monitors 14 and, via a digital interface 16, to the visual security monitoring computer 17. Visual security and monitoring computer 17 has its computer display with a touch panel 18 having a touch panel signaling line (not shown) feeding back signals to the visual security and monitoring computer 17. The visual security and monitoring computer 17 also has a audio output to speaker 20 and can also receive input from a further optional pointing device, such as a mouse 21. The visual security and monitoring computer 17 may also have a data storage unit attached thereto such as a floppy disk drive or a CD rom drive or a zip drive for storing preconfigured photo-realistic photos and images of the actual facility. The intrusion monitoring devices 11 can include automatic video motion detectors (VMD), infrared motion detectors and infrared detectors generally and other motion sensors. The device interface subsystem 16 interfaces with a wide range of commercial security devices including intrusion detection systems, video motion detectors, microwave motion detectors, video multiplexers and other systems and utility closed contact alarm switches and controls. The subsystem interface can consist of three main components, namely, a modular data acquisition unit, software drivers for the data input-output devices and a library of device icons. The base set of software drivers includes interfaces for contact with switch alarm inputs, and for closure/alarm inputs. Customization can involve development of software drivers for serial or network interfaces, device-specific data input-out devices, command control and external devices and modeling of custom alarms and development of the custom graphical user interface controls. The device icon library provides representation for common devices and their alarm states. Each device icon includes visual models and audio cues to represent the device or its sensor coverage area and its possible alarm state. For example, a perimeter fence alarm device could have an icon shaped like a rectangular transparent block with one color for "off" state and colored bright orange and flashing for "on". The audio cues could also have an initial loud alerting sound followed by a lower volume sustained sound. The duration and volume of the audio cues are configurable.

Photo-Realistic 3D Visual Simulation for Physical Security Alarm Monitoring

3D Photo-Recognizable Visual Model

The invention provides a photo-realistic and recognizable 3D model of a facility as a contextual basis for security surveillance, alarm assessment, and situational awareness. The invention's virtual reality user interface provides users with a near real-time command and control augmented reality environment. With minimal training, a new user can exploit this environment to monitor alarm events, perform near instantaneous threat assessment, visualize overlapping coverage, spot gaps in coverage, track developing situations, send commands to security devices with a single touch of the touch screen, and efficiently direct assets in the field.

Figure 1:
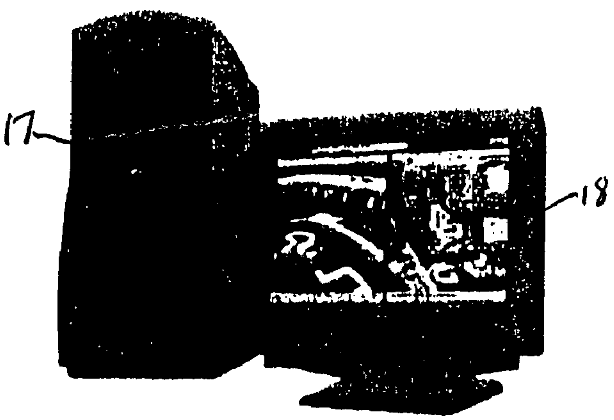
FIG. 1 is a depiction of a the visual security operations console with standard touch screen monitor incorporating the invention.
Figure 3:
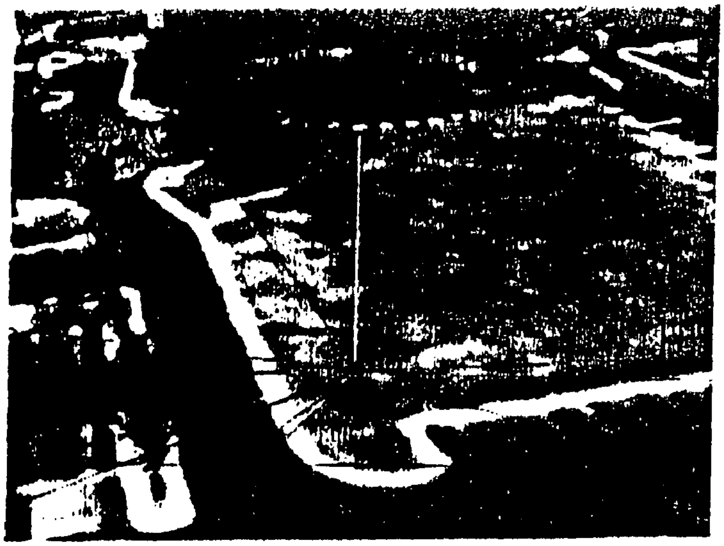
FIG. 3 is a detail of a sensor model representing a pan-tilt-zoom camera; the circular decoration with arrows identifies this as a pan-tilt-zoom camera and the pyramids radiating from the center post represents the camera field of view of a preset pan-tilt-zoom positions that can be called up by touching or clicking on the pyramid volume.
Figure 2:
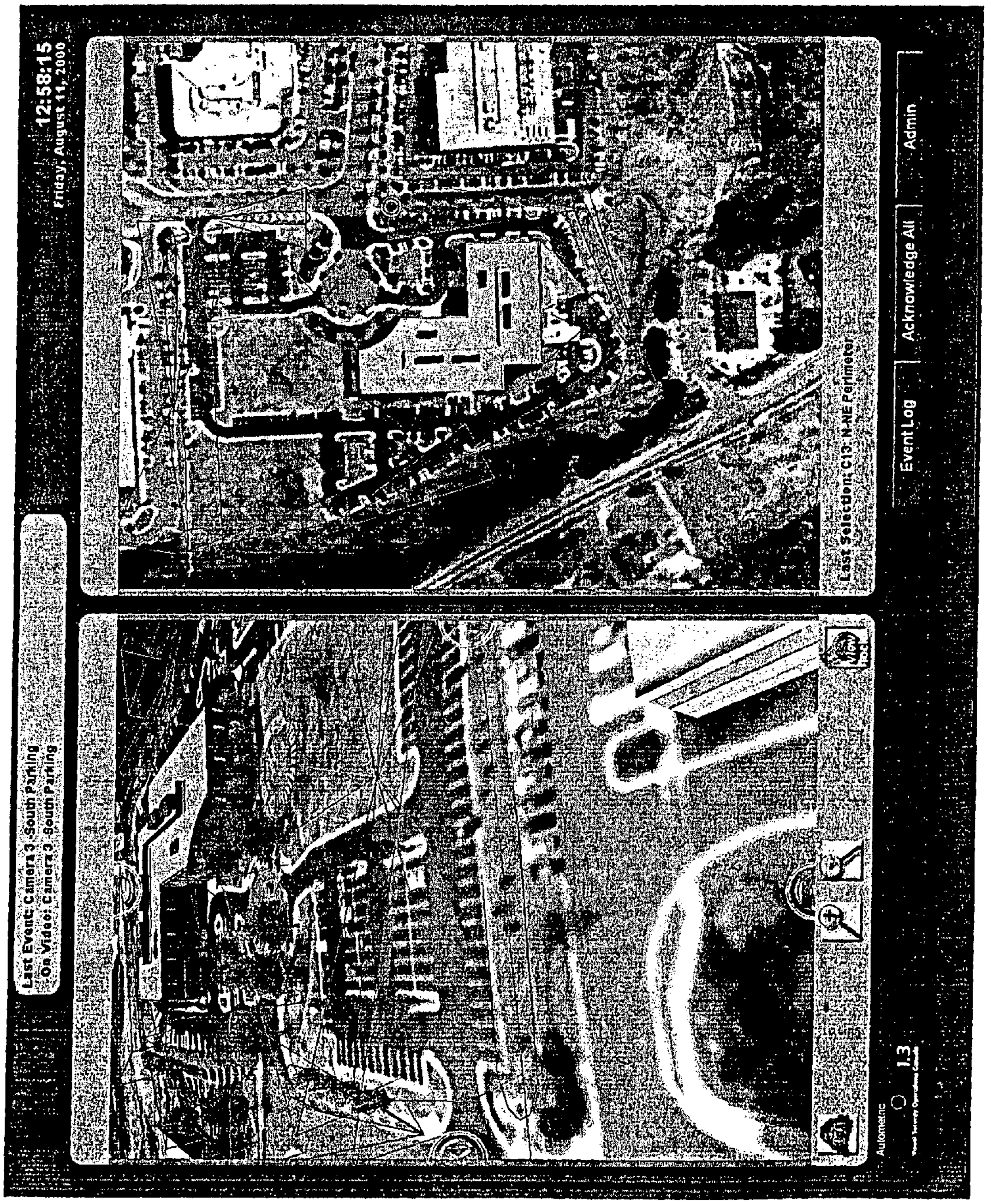
FIG. 2 is a view of the visual security operations console user interface featuring photo-recognizable 2D and 3D displays for alarm visual simulation of events, monitoring, and issuance of command and control in near real-time.
Figure 4:
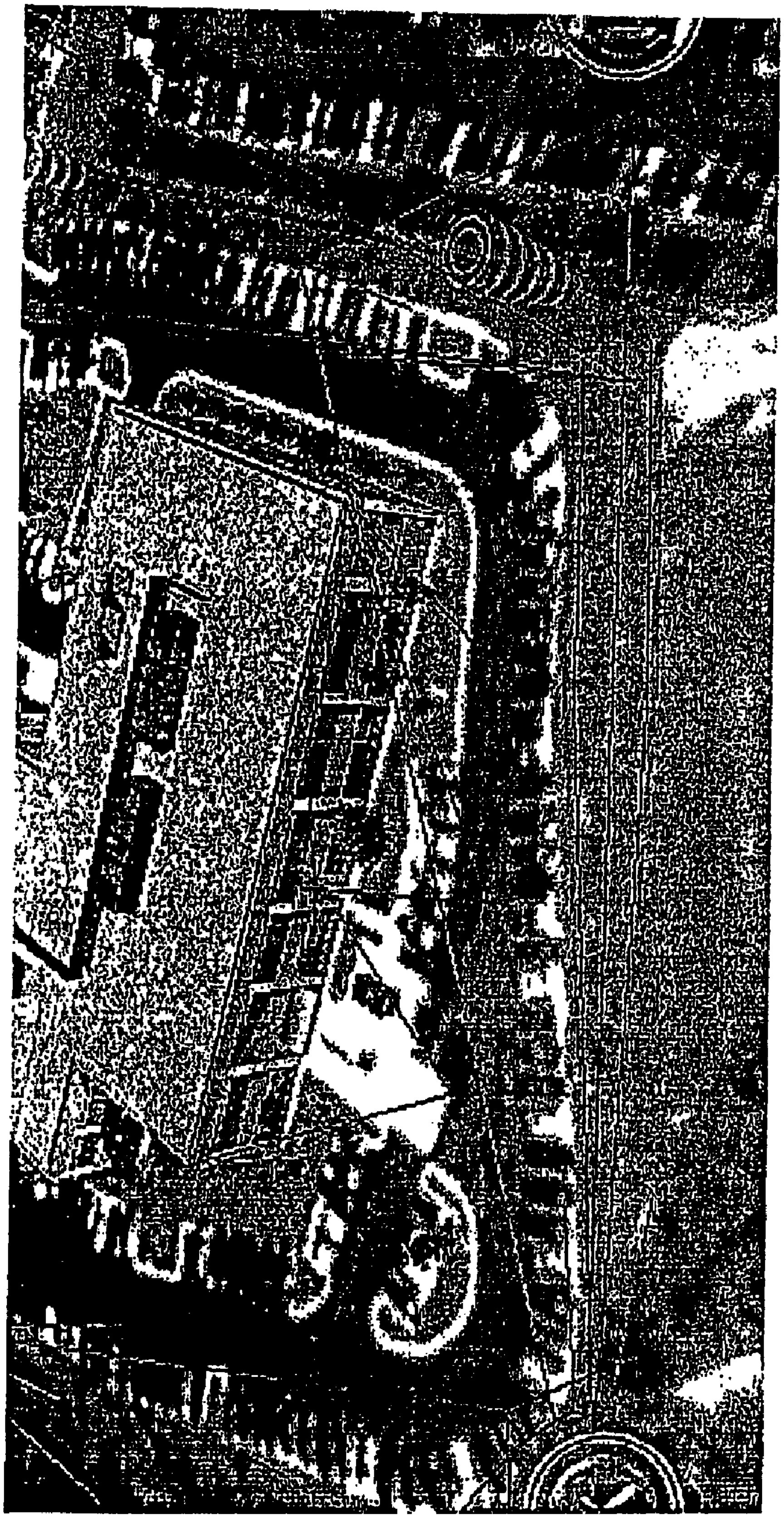
FIG. 4 depicts several sensors in various states of alarm and status; the geometry, colors, textures, material properties and even animation effects are not hard-coded and may be customized.

As shown in FIG. 2, the invention provides 2D and 3D windows that visualize a high-fidelity, real-time model of a facility, its features, and its security sensor configuration. This feature provides end-users with unprecedented situational awareness by simulating views of their facility's security sensor configuration in three dimensions. Navigation is always provided with a rapid but smooth "fly to" that aids users in maintaining their orientation relative to the real world.

3D Icons to Represent Security Devices Coverage Area

The invention represents security devices as trans-lucent 3D models (3D icons) whose volume encompasses the field of view or area of coverage. Each model is rendered in the photo-recognizable 3D and 2D displays at a position, orientation, and scale factor corresponding to their approximate size and position in the real world. This feature permits the user to visualize the normally invisible alarm sensor and camera coverage areas.

3D Representation of Security Device Status

The invention uses translucent textures and/or various animation effects to visualize alarm events and/or changes in the operational status of alarm devices in the field. Upon receipt of a state-changing event from a piece of security equipment in the field, the invention renders a customizable animation whose color, material properties, and animation depict such information as alarm priority, ongoing alarm or past alarm, tamper status, disconnected, acknowledged, selected (by the user), etc.

Combined 3D, Dynamic Audio, and Continuous Fly-To Alarm Annunciation

The invention annunciates an alarm event by performing the following functions simultaneously:

1. Animating the 3D representation of the sensor.
2. Playing a customizable and dynamically generated sound specific to that sensor.
3. Depending upon the activities the user is performing at the time, the system responds by executing a rapid and continuous transition of the 3D eye point to a pre-configured position optimal for viewing the alarming sensor and its surrounding environment; and
4. By sensing any number of hardware commands to any number of other sensor or integrated devices.
5. If the fly-to in Item 3 above was performed, the system may also send a different set of commands to any number of sensors or other integrated devices.

First, the animation of the sensor model (icon) occurs in both the 2D and 3D window.

Second, the invention plays customizable dynamic audio. Sounds for each sensor are different and are user-configurable. Sounds for alarm events normally take the form of a human voice declaring the alarm and the location of the event. In this manner, the operator does not have to be looking directly at the monitor to receive valuable information about possible threat. The invention device plug-ins may modify the sensor to change event sounds at run-time, such that the invention audio may be extra-ordinarily dynamic. At a facility whose security force has subdivided the grounds into a grid system, for example, the invention audio not only annunciates the type of alarm and name of the sensor, it also tells operators the name of the sector or zone of the compound in which the event occurred. If the alarm is a fence sensor and is determined to have occurred in Section H-14-A, the device plug-in modifies the sensor such that the invention seamlessly stitches six separately recorded sounds and may annunciate in a human voice, "Alarm! Fence alarm, Sector H-14-A."

Third, the system automatically provides a rapid and continuous eye point transition from the eye point's current position and orientation (x, y, z, h, p, r) to that of a pre-configured or run-time-calculated position and orientation optimal for viewing the sensor icon, its surrounding features and other nearby sensor. Because the user may be occupied with other activities, the invention will skip this step if the user has been recently interacting with the display, inferring that if this is the case, the user must be physically close to the console and can therefore manually select the alarming sensor when he or she is free to do so.

Fourth, the system automatically sends a series of hardware commands to associated sensors and other integrated devices. Typical implementations of this functionality would be to command an integrated digital video record (DVR) to cache any appropriate video to disk for later recall, or to dial a pager number.

Fifth, if the automatic fly-to was performed, the system sends a different series of hardware commands to associated sensors and other integrated devices. This functionality is typically used to automatically call-up the appropriate live and/or pre-alarm video feed or feeds on one or more video monitors.

Graphical User Interface

Single Mode User-Limited Hemispherical Constant Angle-of-Attack orbit With Point-To-Fly and Variable radius 3D Navigation Feature The invention's integrated 2D and 3D visualization components afford a unique single 3D movement model user interface feature that drastically simplifies 3D scene navigation for the novice and untrained user. The feature combines four user interface controls and/or sub-features that permit the user to achieve full 3D navigational freedom without switching movement modes. the sub-features that comprise the invention's only 3D navigation mode are:

1. Terrain point-to-fly;
2. Sensor point-to-fly;
3. User-limited hemispherical constant angle-of-attack orbit; and
4. User-limited variable radius (or zoom-in/zoom-out).

The combination of features defines a novel navigation strategy, which unlike other visual simulation navigation strategies, presents the user with a natural "point-to-fly" metaphor. The disclosed strategy insures that a user may select a ground point or model feature in either the 2D or 3D windows and to view that ground point or feature from all angles and distances without first flying past the object or area of interest, then having to rotate the view frustum about the eye point, which would demand more time, training, skill, and prior familiarity with the selected feature or ground point. Moreover, no pointer device dragging, double-clocking, right-clocking, or model changes are required for full 3D navigational freedom.

Figure 5A:
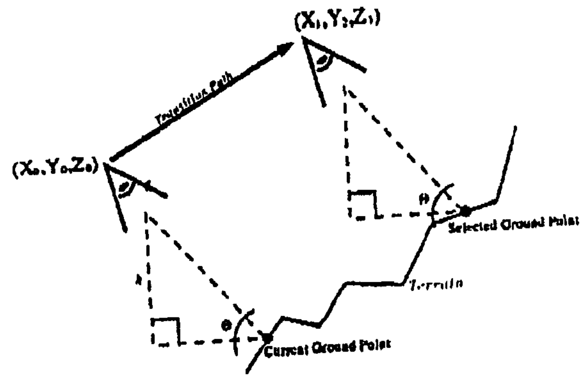
FIG. 5A is a horizontal view of the terrain point-to-fly feature.
Figure 5B:
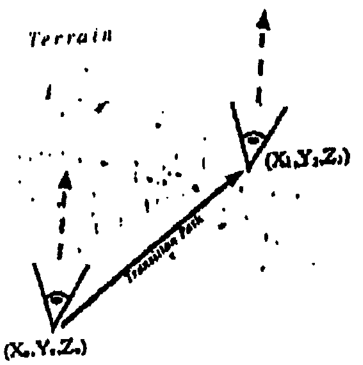
FIG. 5B is a vertical view of the same.
Figure 7A:
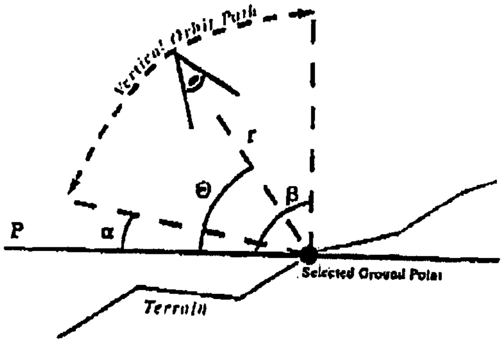
FIG. 7A depicts a horizontal view of a vertical orbit.
Figure 7B:
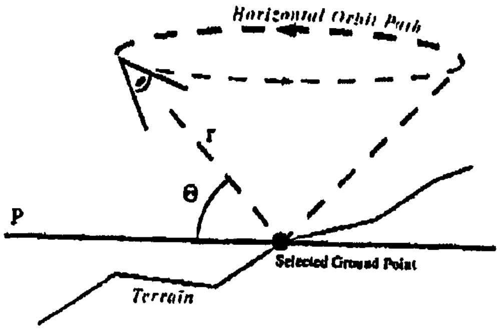
FIG. 7B is a horizontal view of a horizontal orbit.

Terrain Point-to-Fly (FIGS. 5A and 5B)

Using any pointing device (touch screen as disclosed herein or a mouse, etc.), including a touch-screen display, the user touches (or clicks with some pointing devices) any ground point or feature in the 3D or 2D scene. The system responds by repositioning the 3D eye point such that the selected point translates to the center of the view frustum. The transition is continuous, meaning that the eye point travels along a straight line in 3-space at visual simulation frame rates (>20 frames per second), accelerating to a constant velocity, then decelerating as it approaches its final destination. The transition also insures that the heading, pitch, and roll (h, p and r) of the view frustum remain constant from the beginning to the end of the transition. The roll angle always remains at or near 0 to simplify navigation and to disallow potentially confusing orientations and angles of attack. It should be noted that the algorithm compensates for those case when the user selects a point in space that does not intersect with the terrain. This characteristic guarantees that the user's eye point is always centered on some point on the terrain and never direct at the sky or at empty space.

Figure 8:
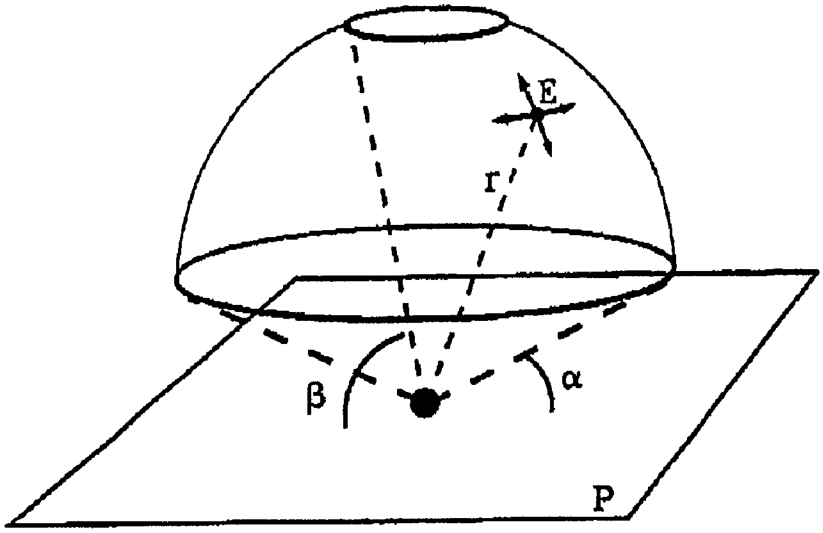
FIG. 8 depicts a 3D volume described by all possible orbit positions of the eye point E; the volume is hemispherical but bounded by user-configurable limits for the eye point's angle of attack; the radius of the hemisphere is controlled with the zoom-in and zoom-out controls, which is bounded by a user-configurable minimum and maximum distance from the selected ground point.
Figure 9:
FIG. 9 are displays which depict both live and pre-alarm video automatically or upon selection of a sensor.

Sensor Point-to-Fly (FIG. 8)

Figure 6:
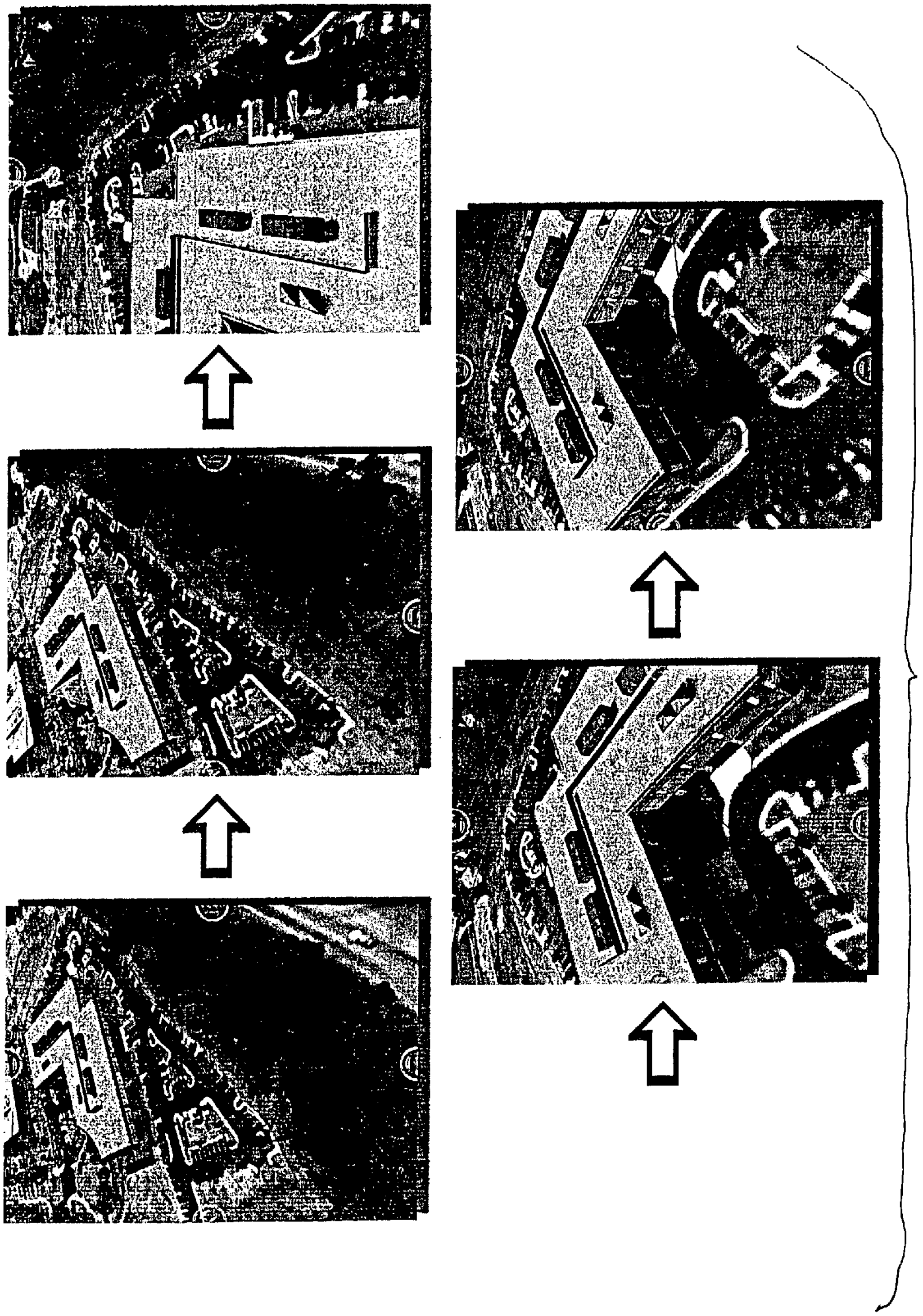
FIG. 6 depicts a 3D window transitioning to a sensor's pre-configured (x, y, z, h, p, r)

Using any pointing device, including a touch-screen display, the user touches or clicks a sensor model (icon) whose shape, texture and animation describe its field of view and alarm status. The system responds by flying to a user-defined pre-configured eye point coordinate and orientation (heading, pitch and roll) specific to that sensor. Simultaneously, the system sends an output command to the sensor's controlling device. The transition of the eye point consists of a simultaneous translation of the eye point to the pre-configured coordinate and the rotation of the view frustum to the pre-configured heading and pitch (FIG. 6). Both transitions occur in a pre-defined constant time regardless of the distance between points, are continuous, and maintain visual simulation frame rates. The transition accelerates to a constant velocity, then decelerates as the eye point approaches its final destination and orientation. The result is that the user's view of the sensor is unobstructed, includes surrounding landmarks and sensor volumes, and any appropriate device commands are automatically issued to the appropriate device(s). This algorithm compensates for possible changes in eye point roll by smoothly adjusting roll variances back to 0° as the transition nears completion.

User-Limited Hemispherical Constant Angle-of-Attack Orbit

Using any pointing device, to include a touch-screen display, the user may orbit the point of the model currently in the center of the 3D view (i.e. that point on the site model at the intersection of a ray orthogonal to the near clipping plane and originating at the eye point). Orbiting is permitted both vertically and horizontally in both directions, although the vertical orbits maximum and minimum angle are bounded by a user-configured maximum and minimum angles which simplifies navigation and increases overall situational awareness by not permitting the user to get so close to the ground as to be oblivious to other events. Orbital navigation is provided by four translucent buttons which overlay the 3D display area at the top, bottom, left and right extents of the display, such that the position and graphical appearance of each clearly implies its intended function to the user without being obtrusive. The translucence of these buttons insures that their representation does not require additional screen real estate and does not obscure any objects or features in the 3D display.

User-Limited Variable Radius

Two pointing device actuated buttons allow the user to vary the length of the radius defined by the distance from the eye point to the ground point at the center of the view frustum. The effect is a zoom-in and zoom-out capability that rounds out the single model 3D navigation feature. This capability has the effect of expanding and collapsing the hemisphere defined by the set of all allowed orbit eye point positions. The radius is bounded by maximum and minimum values defined as an option by the user, which prevents the user from zooming closer or further away than is deemed useful for security systems monitoring and alarm assessment.

2D/3D Point-to-Switch Video Feature

The invention affords the end user the ability to visually switch video input from any number of cameras to a video output device, such as a video monitor or computer screen, by simply touching (clicking with some pointing devices) any camera model in the 2D or 3D scene. When a user selects any model representing any piece of security equipment in the 3D scene, the system determines, via a configurable lookup, which camera (if any) provides the most appropriate view of this device. Immediately upon this determination, the system redirects video output to display the video for that camera. This unprecedented feature relieves the operator's cognitive burden by visually fusing the geospatial context of the camera volume model with the video he/she is viewing. This critical feature improves response time by enabling the user to make any assessment of threat by viewing the video, to instantly recognize where in a 3-space the camera is located, and, if necessary, to accurately dispatch or mobilize a security response, all with a single touch or click.

This feature applies to both live video feeds and cached video feeds from digital video recorders. If the user has a digital video recorder (DVR) integrated with the invention, the invention not only recalls live video upon selection of a sensor volume, it recalls pre-alarm video from the archives of the DVR. This permits the user to visually assess possible threat by viewing the video captured by the DVR in the moments before and after the event was received. This feature is achieved because the invention, in response to an incoming alarm event, sends a command to the appropriate DVR commanding it to archive cached video for the appropriate camera feed. When the sensor is selected, either automatically by the invention or manually by the user, the archived footage is then recalled by the invention and displayed on an appropriate video monitor.

2D/3D Point-to-Command Feature

The invention allows the end user to switch video and to initiate command and control response to alarm events with a touch or a single click of a pointing device. Upon receiving an alarm event, the invention plays a sound and displays a customizable 2D and 3D animation highlighting the sensor that generated that event in the 2D and 3D windows respectively. The user may respond by touching (clicking with some pointing devices) the model or icon that represents the sensor. The system responds by initiating a customizable output command. The output command can then be used to initiate communications dispatch to insure instantaneous security response. In summation, this feature enables acknowledgement of an alarm event, camera switching, and the issuance of command and control with a single touch/click of a 3D and/or 2D graphical representation of the alarm equipment in geographical context.

While the invention has been described in relation to preferred embodiments of the invention, it will be appreciated that other embodiments, adaptations and modifications of the invention will be apparent to those skilled in the art.

What is claimed is:

1. A method of monitoring a facility using a sensor, the method comprising:

generating a two-dimensional display corresponding to a map of the facility;

displaying a two-dimensional sensor icon on the two-dimensional display at a two-dimensional sensor icon location corresponding to an approximate location of the sensor;

generating a three-dimensional display corresponding to a spatially accurate model of the facility, said three-dimensional display having a three-dimensional eye-point from which a perspective of which the model is displayed;

displaying a three-dimensional sensor icon on the three-dimensional display corresponding to the approximate location of the sensor and corresponding to an approximate coverage area of the sensor;

changing the three-dimensional eye-point of the three-dimensional display from a first point away from the sensor to a second point for viewing a perspective of the sensor; and displaying a video output on a video output device selected from a plurality of video inputs.

2. A method as recited in claim 1 wherein changing the three-dimensional eye-point comprises changing the three-dimensional eye-point upon generation of an alarm state.

3. A method as recited in claim 1 wherein changing the three-dimensional eye-point comprises changing the three-dimensional eye-point upon selection of the two-dimensional sensor icon or the three-dimensional sensor icon.

4. A method as recited in claim 1 wherein changing the three-dimensional eye-point comprises changing the three-dimensional eye-point upon selection of a user-selected point on the screen.

5. A method as recited in claim 4 wherein the user-selected point comprises a model feature.

6. A method as recited in claim 4 wherein the user-selected point comprises a ground point in the three-dimensional display.

7. A method as recited in claim 4 wherein the user-selected point comprises a ground point in the two-dimensional display.

8. A method as recited in claim 1 wherein changing the three-dimensional eye-point comprises changing the three-dimensional eye-point so that the second point is in a middle of a view frustum.

9. A method as recited in claim 8 further comprising orbiting the second point to obtain the three-dimensional eye-point.

10. A method as recited in claim 1 wherein generating a three-dimensional display comprises generating a spatially accurate photo-realistic representation of the facility.

11. A method as recited in claim 1 wherein the visual property of the three-dimensional icon in response to changing a status.

12. A method as recited in claim 11 wherein the status corresponds to a physical status.

13. A method as recited in claim 11 wherein the status corresponds to an alarm status.

14. A method as recited in claim 11 wherein the visual property corresponds to texture, color, animation or any combination thereof.

15. A method as recited in claim 1 wherein changing the three-dimensional eye-point comprises changing a view frustum.

16. A method as recited in claim 1 wherein changing the three-dimensional eye-point comprises changing a view frustum along a straight line.

17. A method as recited in claim 1 wherein changing the three-dimensional eye-point comprises changing a view frustum along a straight line at a predetermined acceleration, predetermined velocity and predetermined deceleration.

18. A method as recited in claim 1 wherein changing the three-dimensional eye-point comprises changing a view frustum along a straight line at a predetermined video frame rate.

19. A method as recited in claim 1 further comprising changing an appearance the two-dimensional sensor icon and the three-dimensional view in response to an alarm event.

20. A method as recited in claim 1 further comprising animating the two-dimensional sensor icon and the three-dimensional view in response to an alarm event.

21. A method as recited in claim 1 further comprising generating an audible signal corresponding to an alarm event.

22. A method as recited in claim 1 further comprising in response to an alarm event storing video in a storage device to store video.

23. A method as recited in claim 1 further comprising generating a human voice having a sensor identifier in response to an alarm event.

24. A method as recited in claim 1 wherein the two-dimensional display, three-dimensional display and the video output are displayed simultaneously.

25. A method as recited in claim 1 wherein the two-dimensional display, three-dimensional display and the video output are displayed simultaneously on separate displays.

26. A system for monitoring a facility, the system comprising:

a sensor;

a first display monitor portion generating a two-dimensional display corresponding to a map of the facility, said two-dimensional display displaying a two-dimensional sensor icon at a two-dimensional sensor icon location corresponding to an approximate location of the sensor;

a second display monitor portion generating a three-dimensional display corresponding to a spatially accurate model of the facility, said three-dimensional display having a three-dimensional eye-point from which a perspective of which the model is displayed, said three-dimensional display displaying a three-dimensional sensor icon corresponding to the approximate location and corresponding to an approximate coverage area;

a security monitoring computer in communication with the sensor, the first display monitor portion and the second display monitor portion, said security monitoring computer changing the three-dimensional eye-point of the three-dimensional display from a first point away from the sensor to a second point for viewing a perspective of the sensor; and a video output device displaying a video output selected from a plurality of video inputs.

27. A system as recited in claim 26 wherein the security monitor computer changes the three-dimensional eye-point upon generation of an alarm state from the sensor.

28. A system as recited in claim 26 wherein the security monitor computer changes the three-dimensional eye-point upon selection of the two-dimensional sensor icon or the three-dimensional sensor icon using a pointing device.

29. A system as recited in claim 28 wherein the pointing device comprises a touch screen.

30. A system as recited in claim 28 wherein the pointing device comprises a mouse.

31. A system as recited in claim 26 wherein the security monitoring computer changes the three-dimensional eye-point upon selection of the two-dimensional sensor icon or the three-dimensional sensor icon using a pointing device to select a user-selected point on the two-dimensional display or the three-dimensional display.

32. A system as recited in claim 31 wherein the user-selected point comprises a model feature.

33. A system as recited in claim 31 wherein the user-selected point comprises a ground point in the three-dimensional display.

34. A system as recited in claim 31 wherein the user-selected point comprises a ground point in the two-dimensional display.

35. A system as recited in claim 26 wherein the security monitoring computer changes the three-dimensional eye-point so that the second point is in a middle of a view frustum.

36. A system as recited in claim 26 wherein the three-dimensional display comprises a spatially accurate photo-realistic representation of the facility.

37. A system as recited in claim 26 wherein a visual property of the three-dimensional icon changes in response to changing a status.

38. A system as recited in claim 37 wherein the status corresponds to a physical status.

39. A system as recited in claim 37 wherein the status corresponds to an alarm status.

40. A system as recited in claim 37 wherein the visual property corresponds to texture, color, animation or any combination thereof.

41. A system as recited in claim 26 wherein security monitor computer changes the three-dimensional eye-point by changing a view frustum along a straight line in the three-dimensional display.

42. A system as recited in claim 26 wherein security monitor computer changes the three-dimensional eye-point by changing a view frustum along a straight line in the three-dimensional display along a straight line at a predetermined acceleration, predetermined velocity and predetermined deceleration.

43. A system as recited in claim 26 wherein the computer stores video causes video to be stored in a storage device in response to an alarm.

44. A system as recited in claim 26 wherein the computer generates an audible signal corresponding to an alarm event.

45. A system as recited in claim 26 wherein the audible signal comprises a human voice having a sensor identifier.

46. A system as recited in claim 26 wherein the first display monitor portion, the second display monitor portion and the video output device are separate.

47. A system as recited in claim 26 wherein the first display monitor portion, the second display monitor portion and the video output device are integrated.

* * * * *